(12) United States Patent
Sun-Woo

(10) Patent No.: US 6,370,554 B1
(45) Date of Patent: Apr. 9, 2002

(54) CALENDAR-VIEWING SYSTEM PROVIDING QUICK-ACCESS USER ACTIVITY INFORMATION

(75) Inventor: Chung Sun-Woo, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/134,786

(22) Filed: Aug. 14, 1998

(30) Foreign Application Priority Data

Dec. 15, 1997 (SG) .............................................. 9704455

(51) Int. Cl.⁷ .............................................. G06F 17/30
(52) U.S. Cl. .......................................... 708/112; 707/2
(58) Field of Search ............................... 707/1, 2, 507; 345/763, 781, 804; 708/111, 112

(56) References Cited

U.S. PATENT DOCUMENTS

| | | | | |
|---|---|---|---|---|
| 5,222,209 A | * | 6/1993 | Murata et al. ............... | 345/804 |
| 5,768,164 A | * | 6/1998 | Hollon, Jr. ................... | 708/174 |
| 5,842,009 A | * | 11/1998 | Bovovoy et al. ............... | 707/1 |
| 5,873,108 A | * | 2/1999 | Goyal et al. ................. | 707/507 |
| 6,034,621 A | * | 3/2000 | Kaufman .................... | 340/7.21 |

OTHER PUBLICATIONS

Moseley et al., Mastering Miocrosoft Ofice 97 Professional Edition, Dec. 13, 1996, Sybex, Inc., 2nd ed., pp. 783–798.*

"Peek Daily Event Details On A Reference Calendar" IBM Technical Disclosure Bulletin, US, IBM Corp. New York, vol. 36, No. 4, Apr. 1, 1993, pp. 23–25, XP000364430 ISSN: 0018–8689.

"Selecting a Daily Calendar From a Monthly Calendar", IBM Technical Disclosure Bulletin, Jan. 1984, vol. 26, No. 8, p. 4381.*

Two–Level Peek on Container Objects, IBM Technical Disclosure Bulletin, Oct. 1993, vol. 36, No. 10, p. 461–462.*

* cited by examiner

Primary Examiner—Jack Choules

(57) ABSTRACT

A calendar-viewing system comprising a calendar-viewing program in execution in a handheld computing device is disclosed. The calendar-viewing system has a display for presenting a calendar view to a user. In the calendar view, a period of interest is prescribed, and the user activity information for that prescribed period is shown. However, only limited or truncated text descriptions of the activities in each day of the prescribed period is provided in the calendar view. To quickly access further user activity information for a selected period within the prescribed period, the user can activate a view of a set of user activity information for the selected period. This view then replaces a portion of the calendar view.

4 Claims, 5 Drawing Sheets

CALENDAR-VIEWING SYSTEM PROVIDING QUICK-ACCESS USER ACTIVITY INFORMATION

FIELD OF INVENTION

The invention relates generally to calendar-viewing systems. In particular, it relates to a calendar-viewing system in a handheld computing device which provides quick-access user activity information without switching views on a display.

BACKGROUND OF THE INVENTION

Palmtops and Personal Digital Assistants, or generally handheld computing devices, are portable electronic devices intended for mobile users. Hence, these devices are designed and built to be compact and lightweight. Consequently, such devices have limited display areas for presenting information to the users. In addition, handheld computing devices have limited storage capacities. This limitation inherently affects their computational and data transfer speeds.

Since handheld computing devices are also often used as personal organizers, with which the users can take everywhere, they are typically installed with calendar-viewing programs. Calendar-viewing programs generally show arrangements of days, weeks and months in a year. For practical purposes, some calendar-viewing programs also provide user activity information to the users in the same view. User activity information includes, for example, the date, start time, description and venue of each activity. However, due to the limited display area of the handheld computing devices in which such programs are executing, the user activity information presented to the user is also limited. For example, a monthly view of a prior art calendar-viewing program in FIG. 1 defines or prescribes a period of a calendar month (October) in a calendar year (1997). The monthly view also allows only a maximum of three lines of truncated text description of the user activities to be displayed for each day. Usually, the users will not find these truncated descriptions very useful or informative if the full text descriptions are lengthy.

In order to provide users with better descriptions and more information on their activities for each day, some of these calendar-viewing programs are associated with daily activities tracking programs. Daily activities tracking programs generally provide means for users to enter and view their user activity information for a day according to pre-defined or user-defined time slots. In such associations, the user can launch the daily activities tracking program for a particular day by actuating an indicia (for example, the October 15 cell in FIG. 1) for that day in the calendar-viewing program. The handheld computing device display subsequently switches from the calendar view to a view of the daily activities tracking program showing the user activity information for that day.

While such calendar-viewing programs associating with daily activities tracking programs have achieved substantial commercial use, they suffer from disadvantages. A disadvantage addressed by the present invention is that in launching an associated daily activities tracking program from a calendar-viewing program, substantial computational and data transfer activities occur in the handheld computing device. Consequently, the process of switching views on the handheld computing device display becomes time-consuming. The wait for such switching of views to take effect may be undesirable to the mobile user.

Another disadvantage addressed by the invention is that the daily activities tracking programs may not present all the user activity information for a selected day in the same view. Usually, the user is required to scroll up and down the views presented by the daily activities tracking programs, due to its use of time slots, in order to gather the necessary information.

Variations of such calendar-viewing programs have been proposed and commercialized for a variety of reasons. For instance, the Calendar for Windows CE program by Microsoft Corporation provides a view of a calendar month juxtaposed to a view of a set of user activity information for a selected day within that calendar month. However, this program does not provide a user with any user activity information for each day, except for the selected day, of the calendar month. Moreover, such a program requires the user to scroll through the view of the user activity information to gather the necessary information.

It is therefore an object of the present invention to provide a calendar-viewing system in a handheld computing device which provides quick-access user activity information of a selected period without switching views on a display.

SUMMARY OF THE INVENTION

A handheld computing device is provided with a calendar-viewing system for displaying a calendar view. The calendar view prescribes a period to a user, who is then provided with access to user activity information. During the preparation for displaying the calendar view, a set of information pertaining to such a view is read from a database in the handheld computing device. This set of calendar view information also includes a set of user activity information for the prescribed period. After displaying the calendar view to the user, the calendar-viewing system then allows the user to select a period within the prescribed period for viewing a set of user activity information for that selected period. A view of the user activity information for the selected period then replaces a portion of the calendar view. The image of that portion of the calendar view is also stored.

In a preferred embodiment of the invention, the view of the user activity information for the selected period is contiguous with an indicia of the selected period in the calendar view. In addition, this view is sized accordingly to economically fit the corresponding user activity information. Furthermore, a re-display of the image of the portion of the replaced calendar view is possible, thereby resulting in closing the view of the user activity information.

The calendar-viewing system provides a quick access to user activity information in the same view as the calendar view, thereby conveniently affording the mobile user with timely information.

BRIEF DESCRIPTION OF THE DRAWINGS

The invention will be better understood with reference to the drawings, in which.

DESCRIPTION OF THE PREFERRED EMBODIMENTS

Figure 1:
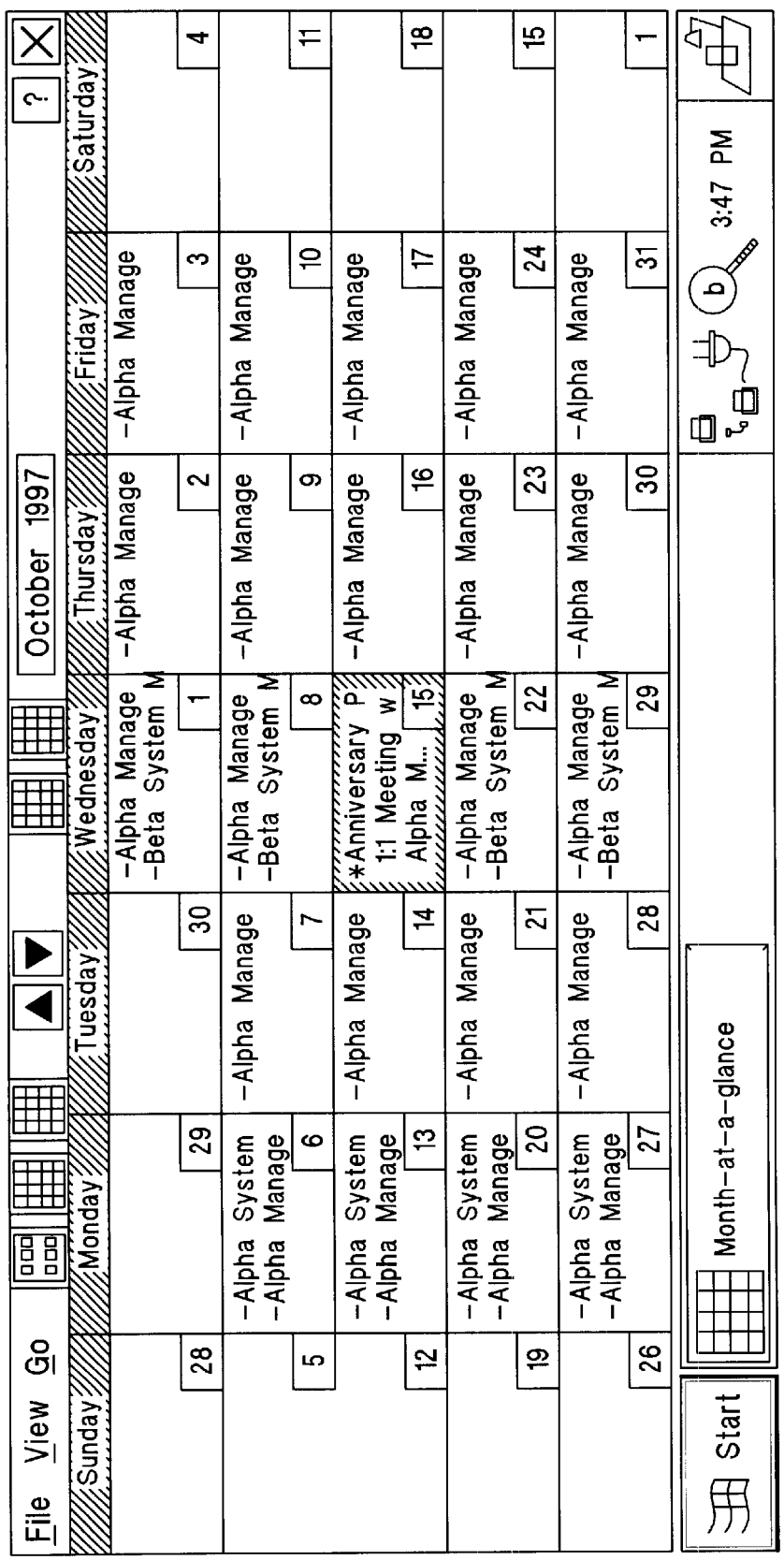
FIG. 1 shows a monthly calendar view of a prior art calendar-viewing program.
Figure 2:
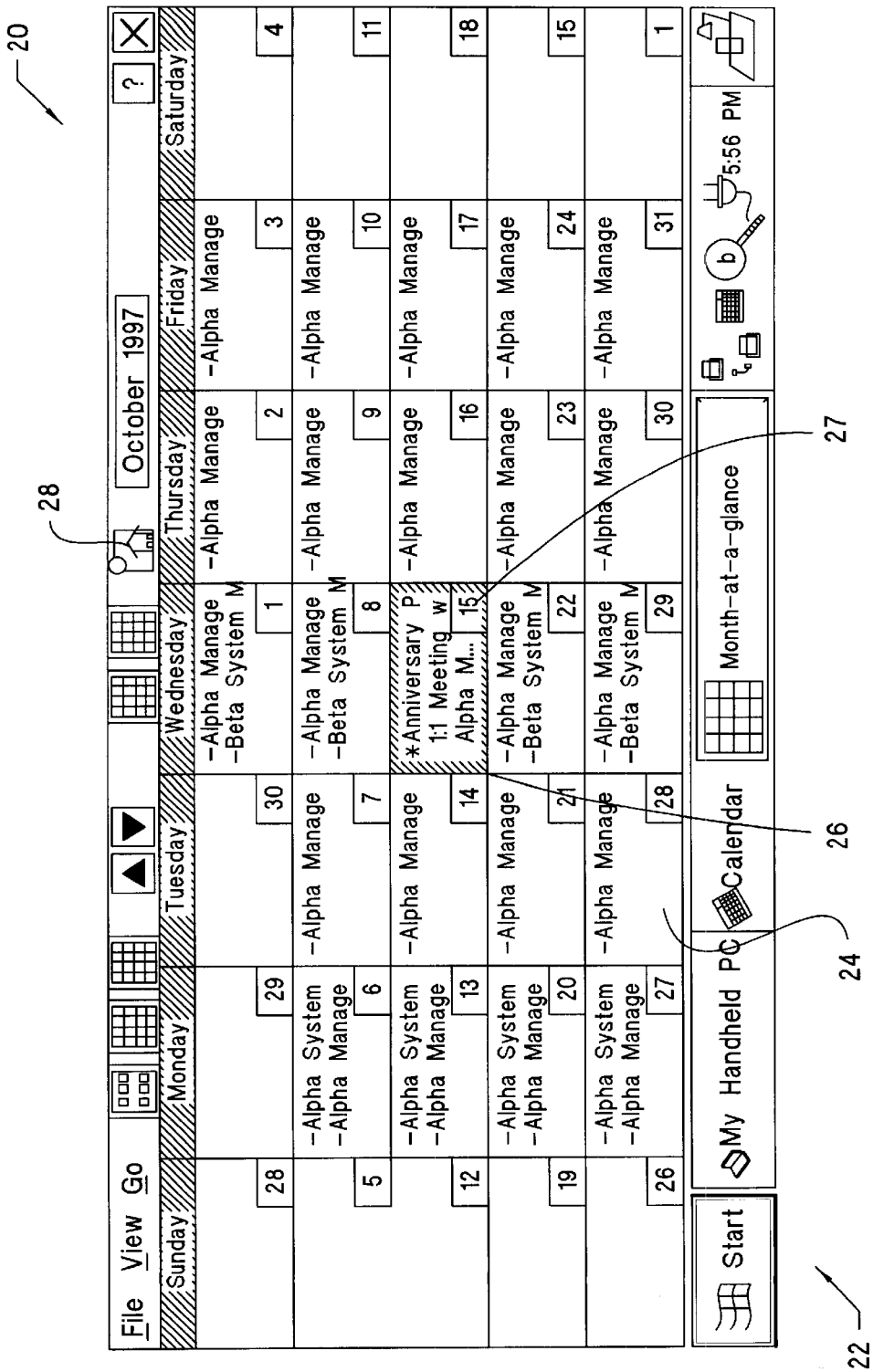
FIG. 2 shows a monthly calendar view of calendar-viewing program in execution in a handheld computing device display according to a preferred embodiment of the present invention.
Figure 3:
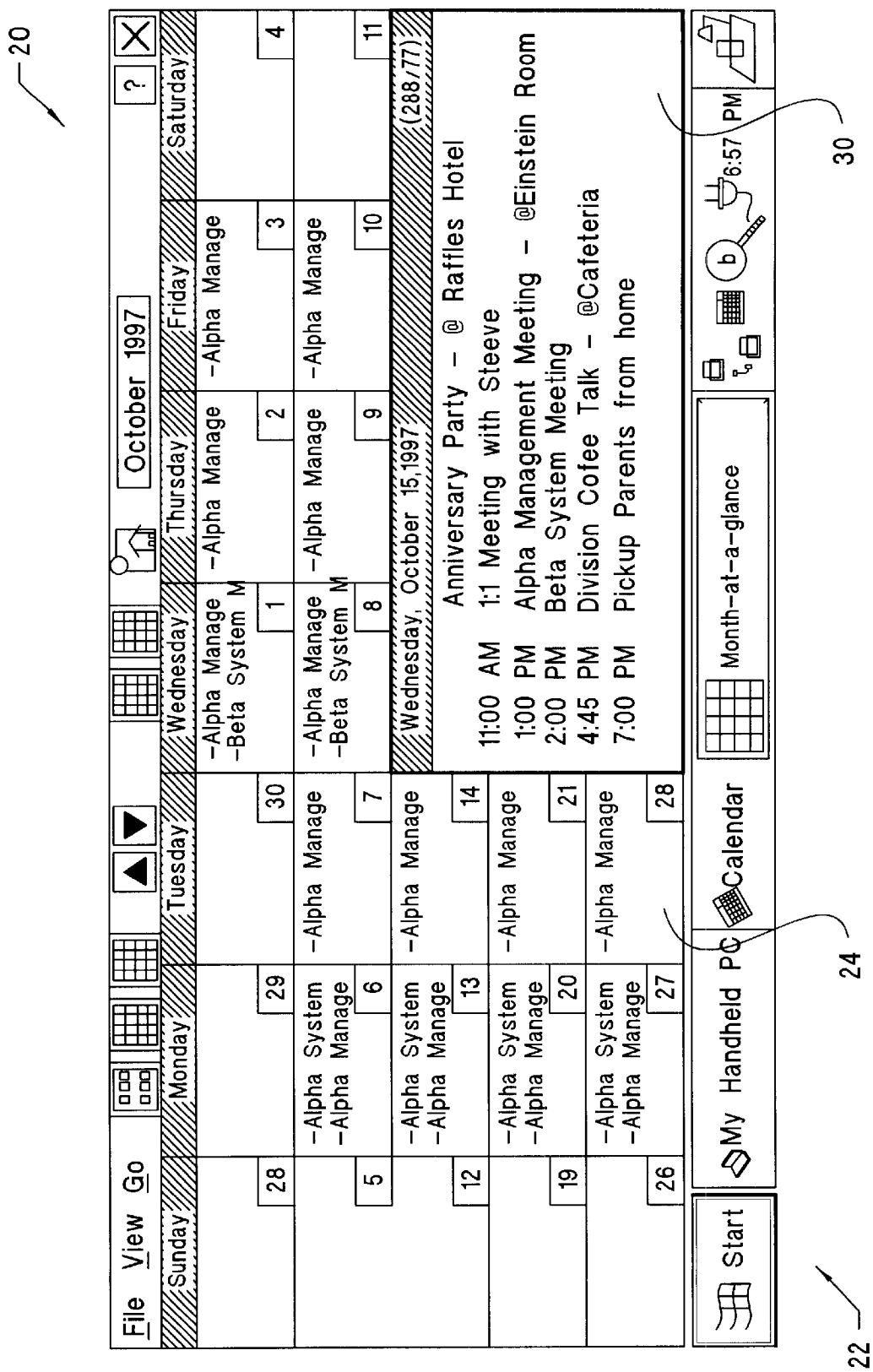
FIG. 3 shows a monthly calendar view of a calendar-viewing program in FIG. 2, a portion of which is replaced by a detailed view.

Reference is first made to FIG. 2 and FIG. 3 to describe a calendar-viewing system, which comprises a calendar-viewing program in execution in a handheld computing device (not shown). The calendar-viewing system is provided as a preferred embodiment according to the invention, and has a handheld computing device display 20. The display 20, which is also a touch panel, is shown in FIG. 2 to present a monthly calendar view 22 to a user. This monthly calendar view 22 defines or prescribes a period of interest and shows a series of day cells 24, whereby each day cell 24 represents each day within the prescribed period. The day cells 24 are chronologically associated, and each day cell 24 contains date information and limited truncated text descriptions of a set of user activity information for the corresponding day. The calendar-viewing program also provides the user with aO detailed view 30, as shown in FIG. 3, which details the user activity information for a selected day within the prescribed period. The detailed view 30 contains such user activity information as the start time, description and venue (if available) of each activity, in addition to the date and day-of-the-week information for that day. When the user activates the detailed view 30, it replaces a portion of the monthly calendar view 22. Meanwhile, the image of the replaced portion of the monthly calendar view 22 is stored for re-display when detailed view 30 is closed, or deactivated.

The functional aspect of the calendar-viewing system will now be described in more detail. As mentioned in the foregoing, the calendar-viewing system provides the user with access to detail user activity information via the detailed view 30. The motivation for showing the detailed view 30 partially replacing the monthly calendar view 22 is to provide user activity information without switching views on the display 20. If the display 20 switches view from the monthly calendar view 22 to another view from a different program for providing the user activity information, some time will be used to launch, and close, that program.

The user may activate the detailed view 30 for a particular day by actuating a predefined key or button (not shown) on the handheld computing device when the day cell 24 for that day is selected. As shown in FIG. 2, a cell indicia 26 highlights a selected day cell 24. Alternatively, the user may actuate onscreen date button 27 or icon 28 on the touch panel-display 20 with a stylus (not shown) to activate the detailed view 30. The touch panel-display 20 and the stylus and the predefined key or button, as actuating means for activating the detailed view 30, are part of the handheld computing device input means. The detailed view 30 providing the user activity information for the selected day, once activated, is subsequently displayed on top of, or replacing, the cell indicia 26 and other day cells 24 on the monthly calendar view 22.

The amount of user activity information for the selected day determines the size of the detailed view 30. Usually, the detailed view 30 will span several day cells 24 both in width and height, starting with the cell indicia 26 and then covering the day cells 24 to the right of and below it. If the display area to the right of or below the cell indicia 26 is insufficient for the detailed view 30 to display all the user activity information, the day cells 24 to the left of or above the cell indicia 26 will be utilized respectively. As shown in FIG. 3, the detailed view 30 provides the user with such useful general information as the day-of-the-week and date information at its upper left-hand corner, and the Julian days information at its upper right hand corner. In particular, the detailed view 30 provides such user activity information as the start time, description and venue (if available) of each activity.

When the user actuates the predefined key or button again, or any part of the touch panel-display 20 outside of the detailed view 30, the display 20 will revert to the original monthly calendar view 22.

Figure 4:
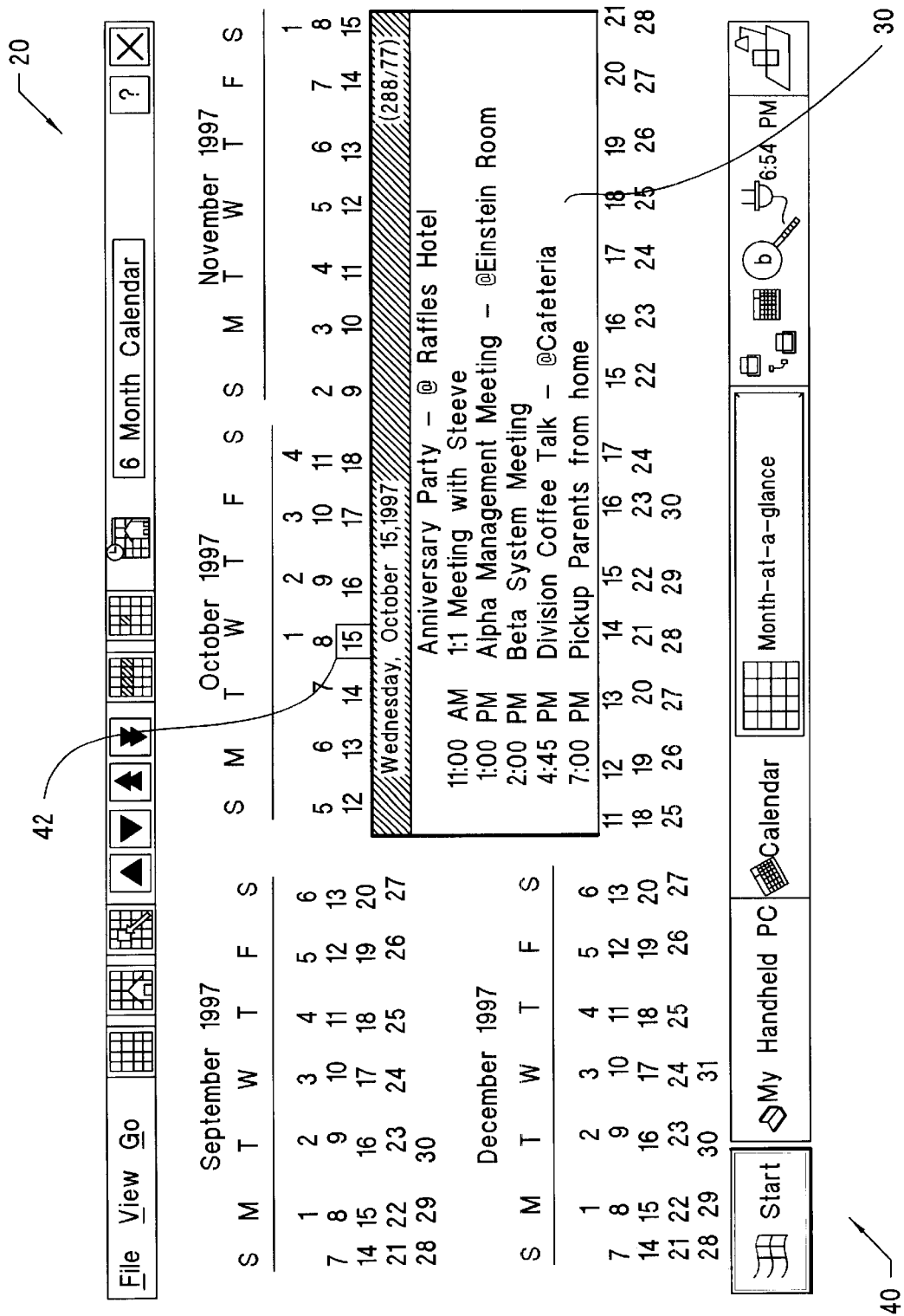
FIG. 4 shows a multiple-month calendar view of the calendar-viewing program in FIG. 2, a portion of which is replaced by the detailed view.

The calendar-viewing system is also capable of displaying a multi-month calendar view 40 which prescribes a period of six months, as shown in FIG. 4. From the multi-month calendar view 40, the detailed view 30 for a selected day can be activated or deactivated in the same way as described in the preceding sections. When activated, the detailed view 30 is displayed on top of, or replacing, a portion of the multi-month calendar view 40. A date indicia 42 on the multi-month calendar view 40 highlights the selected day within the prescribed six-month period. By default, the detailed view 30 is shown below the date indicia 42. Again, it may be displayed to the left or right of, or above, the date indicia 42 depending on the availability of the display area of display 20. In general, the detailed view 30 is contiguous with the date indicia 42.

To better understand the operational aspect of the calendar-viewing system, the control flow in the calendar-viewing program and the corresponding hardware in the handheld computing device will now be described in more detail. The display 20 essentially comprises of hardware capable of carrying out low level drawing instructions for displaying text when the hardware receives such instructions together with the corresponding text display data. Methods of displaying text using low level drawing instructions generally provide low level or direct display 20 hardware control, thereby resulting in low display overheads. Consequently, minimal time is used to display text on the display 20. A preferred low level drawing instruction is the DrawText command that is used in the Windows CE operating system (OS) of the handheld computing device. The display 20 hardware is also capable of efficiently performing block data transfer operations for display purposes. Such block data transfer operations include reading a stored image, for example of a portion of a view on display 20, from a memory and displaying that image. A preferred block data transfer operation is the Bit Block Transfer operation that is used in the Windows CE operating system (OS) of the handheld computing device. In addition to the display 20 hardware, the handheld computing device also comprises a database that contains all the user activity information. This database stores such user activity information as the date, start time, description and venue (if available) of each activity.

Figure 5:
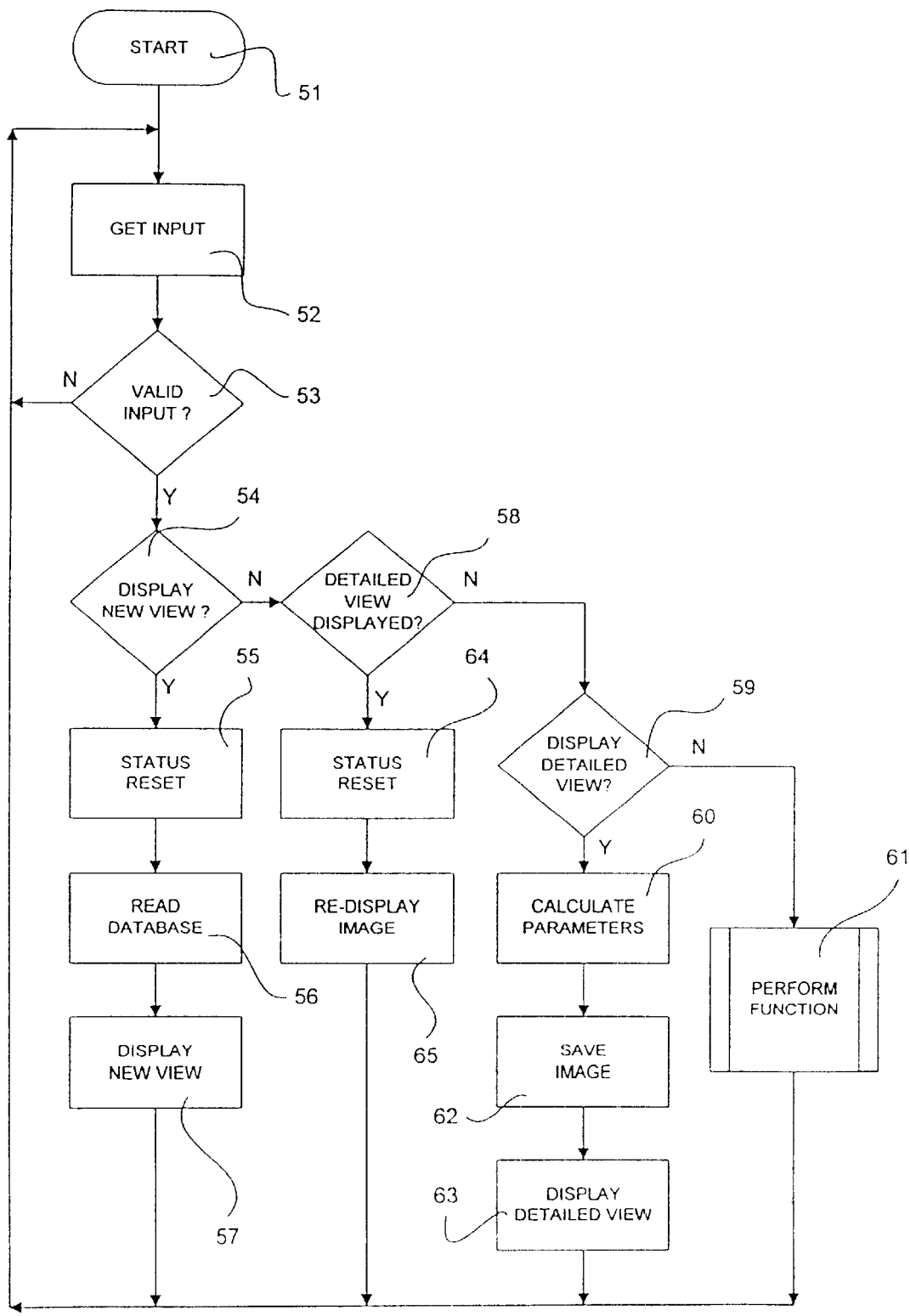
FIG. 5 shows an operational control flow diagram of the calendar-viewing program in FIG. 2.

Reference is now made to FIG. 5 to describe the control flow in the calendar-viewing program when it displays a monthly calendar view 22 as shown in FIG. 2. When the user launches the calendar-viewing program, it enters a START state 51. In the START state 51, the monthly calendar view 22 is prepared and presented on display 20. During the preparation of the monthly calendar view 22, the calendar-viewing program reads from the database containing the user activity information. After reading all the user activity information for the period prescribed by the monthly calendar view 22, the calendar-viewing program sorts the user activity information in a chronological ascending order. Subsequently, the date and truncated text descriptions of the first three activities for each day within the prescribed period are shown in the corresponding day cell 24.

After presenting the monthly calendar view 22 to the user in START state 51, the calendar-viewing program enters a GET INPUT state 52. In this state, the calendar-viewing program waits for an input which can either originate from the user, other programs also in execution, or the OS. An example of an OS-originated input is a time-change input which updates the time shown at the lower right hand corner of the monthly calendar view 22.

Upon receiving an input in GET INPUT state 52, the calendar-viewing program then enters a VALID INPUT? state 53. The calendar-viewing program now tests if the input received in the GET INPUT state 52 is intended for its processing. If the input does not require any processing by the calendar-viewing program, the calendar-viewing program then loops back to the GET INPUT state 52 and waits for the next input. Otherwise, the calendar-viewing program will continue and enter a DISPLAY NEW VIEW? state 54.

In the DISPLAY NEW VIEW? state 54, the calendar-viewing program tests if the input received in the GET INPUT state 52 is an instruction from the user to change the monthly calendar view 22. An example of the result of such a change is a monthly calendar view 22 which prescribes a different period. When this type of instruction is received, the calendar-viewing program will enter a STATUS RESET state 55. Otherwise, the calendar-viewing program will enter a DETAILED VIEW DISPLAYED? state 58.

During the STATUS RESET state 55, the calendar-viewing program resets a detailed view flag which represents the activity status of the detailed view 30. The detailed view flag is set or reset when the detailed view 30 is activated or deactivated respectively. After resetting the detailed view flag, the calendar-viewing program enters a READ DATABASE state 56 whereby it prepares to change the monthly calendar view 22. Here again, the calendar-viewing program reads a set of user activity information for the period prescribed by the new monthly calendar view 22. The calendar-viewing program then sorts the user activity information in an ascending chronological order. Subsequently, the calendar-viewing program changes the monthly calendar view 22 when it enters a DISPLAY NEW VIEW state 57. The date and truncated text descriptions of the first three activities for each day within the new prescribed period are now shown in each corresponding new day cell 24. Upon completion of the monthly calendar view 22 change, the calendar-viewing program will loop back to the GET INPUT state 52 to wait for the next input.

In the event that the input received in the GET INPUT state 52 is not an instruction from the user to change the monthly calendar view 22, the calendar-viewing program will enter the DETAILED VIEW DISPLAYED? state 58. From this state, the calendar-viewing program will again enter a STATUS RESET state 64 if the detailed view flag is tested to be set. If the detailed view flag is in a reset state, the calendar-viewing program will enter a DISPLAY DETAILED VIEW? state 59.

In the DISPLAY DETAILED VIEW? state 59, the calendar-viewing program again tests the input received in the GET INPUT state 52. If the calendar-viewing program receives an instruction from the user to display the detailed view 30 for a selected day, it will enter a CALCULATE PARAMETERS state 60. Otherwise, the calendar-viewing program will enter a PERFORM NON-VIEW FUNCTION state 61 where it will perform functions that are not related to either changing the monthly calendar view 22, or activating or deactivating the detailed view 30. An example of such functions includes the previously mentioned updating of the time shown at the lower right-hand corner of the monthly calendar view 22. Another example is the selection of a day cell 24 for a particular day resulting in the display of the corresponding indicia 26. Subsequently the calendar-viewing program will loop back to the GET INPUT state 52 and wait for the next input.

The calendar-viewing program, in the CALCULATE PARAMETERS state 60, calculates the required size of the detailed view 30 to economically fit all the user activity information for the selected day. By default, the size of the detailed view 30 should span four days' cells 24 in width and one day's cell 24 in height. If all the user activity information for the selected day cannot fit into the detailed view 30 of such a size, its height will then be incremented by one day's cell 24. Following that, the calendar-viewing program then determines the display position of the detailed view 30 with reference to the cell indicia 26, as mentioned in a preceding section.

Once the calendar-viewing program has determined the size of the detailed view 30 and its position on the monthly calendar view 22, the calendar-viewing program will enter a SAVE IMAGE state 62. In this state, the calendar-viewing program copies, to the memory, the portion of the monthly calendar view 22 that will be replaced by the detailed view 30 according to the above size and position. Subsequently, the calendar-viewing program enters a DISPLAY DETAILED VIEW state 63 whereby it will present the detailed view 30 for the selected day and provide the corresponding user activity information. To do so, the calendar-viewing program writes the user activity information for the selected day to the display 20 hardware together with low level drawing instructions. Consequently, fast and efficient display of the detailed view 30 is achieved and the calendar-viewing program subsequently loops back to the GET INPUT state 52 to wait for the next input.

From the DETAILED VIEW DISPLAYED? state 58, the calendar-viewing program will enter a STATUS RESET state 64 if the detailed view flag is tested to be set. During the STATUS RESET state 64, the calendar-viewing program resets the detailed view flag which had been set previously due to the activated detailed view 30. After resetting the detailed view flag, the calendar-viewing program will continue and enter a RE-DISPLAY IMAGE state 65. In this state, the calendar-viewing program instructs the display 20 hardware to re-display the previously stored image of the replaced portion of the monthly calendar view 22 by performing a block data transfer operation. When the monthly calendar view 22 is restored, the calendar-viewing program then loops back to GET INPUT state 52 to wait for the next input.

The same control flow in the foregoing also applies to the calendar-viewing program when it displays a multi-month calendar view 40 as shown in FIG. 4.

The preferred embodiment can be modified in many ways. For example, instead of using low level drawing instructions for displaying the detailed view 30 and block data transfer operations for re-displaying the monthly calendar view 22, known Graphical User Interface (GUI) display methods may be used. For example, a GUI pop-up dialog box may be used to present user activity information to the user by replacing a portion of the monthly calendar view 22. However, the display overheads for activating and deactivating a dialog box will be substantially higher than that for activating and deactivating the detailed view 30 using low level drawing instructions and block data transfer operations. As another example, the calendar-viewing program may allow a user to select a period spanning a few days and display the user activity information for that period. Similarly, the user may also be allowed to define the period represented by the calendar view, instead of the single-month or six-month period described above.

I claim:

1. A method for displaying a calendar view for a prescribed first period of a calendar on a handheld computing device having a display and a database, comprising the steps of:

reading a set of information for the calendar view from the database;

prior to displaying the calendar view, collecting all user activity information for the entire first period prescribed by the calendar view from the database;

displaying the calendar view on the handheld computing device display using the calendar view information;

enabling the user to select a second period within the first period prescribed by the calendar view;

replacing a portion of the calendar view using a first set of user activity information corresponding to the selected second period; and storing the image of the portion of the calendar view to be replaced by the view of the first set of user activity information corresponding to the selected second period.

2. The method as in claim 1, further comprising the step of enabling the re-display of the image of the portion of the calendar view replaced by the view of the user activity information for the selected second period.

3. The method as in claim 2, wherein the step of replacing the portion of the calendar view using the user activity information for the selected second period further includes controlling the handheld computing device display directly for drawing the view of the user activity information on the handheld computing device display.

4. The method as in claim 3, wherein the step of directly controlling the handheld computing device display for drawing the view of the user activity information on the handheld computing device display further includes performing block data transfer by using the handheld computing device display to re-display the image of the portion of the calendar view replaced by the view of the user activity information for the selected second period.

* * * * *